United States Patent [19]

Juhlin

[11] Patent Number: 5,677,852
[45] Date of Patent: Oct. 14, 1997

[54] METHOD AND ARRANGEMENT FOR DETECTING AND DAMPING TRANSCIENT OSCILLATIONS AT OR NEAR A NATURAL RESONANT FREQUENCY IN A POWER TRANSMISSION SYSTEM

[75] Inventor: Lars-Erik Lennart Juhlin, Ludvika, Sweden

[73] Assignee: Asea Brown Boveri AB, Västerås, Sweden

[21] Appl. No.: 397,173

[22] PCT Filed: Sep. 15, 1993

[86] PCT No.: PCT/SE93/00747

§ 371 Date: Mar. 8, 1995

§ 102(e) Date: Mar. 8, 1995

[87] PCT Pub. No.: WO94/07291

PCT Pub. Date: Mar. 31, 1994

[30] Foreign Application Priority Data

Sep. 15, 1992 [SE] Sweden .................. 9202654

[51] Int. Cl.⁶ ................................ G01R 19/00
[52] U.S. Cl. ............................ 364/572; 364/483
[58] Field of Search ..................... 364/572, 481, 364/483, 492; 333/17.1; 322/99, 58, 19; 363/97, 126; 361/118; 323/211; 307/105

[56] References Cited

U.S. PATENT DOCUMENTS

| | | | |
|---|---|---|---|
| 4,434,376 | 2/1984 | Hingorani | 307/102 |
| 4,567,423 | 1/1986 | Dobsa et al. | 322/58 |
| 4,724,333 | 2/1988 | Hedin | 307/105 |
| 4,788,653 | 11/1988 | Henderson et al. | 322/58 |
| 4,855,664 | 8/1989 | Lane | 322/19 |
| 4,999,564 | 3/1991 | D'Antonio et al. | 322/99 |
| 5,053,691 | 10/1991 | Wild et al. | 323/211 |
| 5,159,544 | 10/1992 | Hughey et al. | 363/97 |
| 5,398,150 | 3/1995 | Standler | 361/118 |
| 5,426,579 | 6/1995 | Paul et al. | 363/126 |

*Primary Examiner*—James P. Trammell
*Attorney, Agent, or Firm*—Watson Cole Stevens Davis, P.L.L.C.

[57] ABSTRACT

Apparatus for damping oscillations at or near a natural resonant frequency in a power transmission system, in which an oscillator emits a reference signal oscillating at the natural resonant frequency; a multiplication circuit for multiplying an operating signal corresponding to the prevailing operating condition of the HVDC-system with the reference signal; a memory and a clock-pulse generator for serially sampling the output signal from the multiplication circuit by clock-pulses; the memory has the capacity to store sampling values up to a number which at least corresponds to the period of the reference signal; a summation circuit which, via a parallel output from the memory, for summing a number of the latest sampling values which corresponds to at least one period of the reference signal; a diagnostic and determination circuit provided with the output signal from the summation circuit, in which circuit the size, sign, variability and presence of an output signal from the summation circuit is tested according to determined criteria; means for generating a regulating signal provided with an output signal from the summation circuit, and a circuit closer activated by the output signal from the diagnostic and determination circuit when a criterion for oscillation which is to be damped is fulfilled, which circuit closer is placed between the output of the circuit closer for generating a regulating signal and a regulating device in the power transmission system.

14 Claims, 5 Drawing Sheets

METHOD AND ARRANGEMENT FOR DETECTING AND DAMPING TRANSCIENT OSCILLATIONS AT OR NEAR A NATURAL RESONANT FREQUENCY IN A POWER TRANSMISSION SYSTEM

The present invention relates to a method for detecting and damping transient oscillations in a power transmission system, and an arrangement for carrying out the method.

BACKGROUND OF THE INVENTION

In a plant for transmission of high voltage direct current, an HVDC-plant, transient oscillations can arise due to various reasons. They can occur, for example, due to earth faults, short circuits and misfiring valves, as well as during certain control operations during normal operation, such as ramps during starting, stopping, restarting after faults or stabilizing operations. The natural resonance of transient oscillations at certain frequencies is particularly large, whereby the natural resonant frequencies are well defined depending on the configuration of the system and the frequency of the alternating current side of the circuit. At resonance, the amplitude of the oscillations can quickly grow to dangerous levels which considerably exceed the rated quantity of the plant. This causes the energy transmission to be interrupted by safety systems. In addition, lasting oscillations can affect other regulating systems in the alternating current parts of the total network. Furthermore, larger alternating current components with fundamental frequency in the direct current transmission can result in the connected alternating current system obtaining an undesired direct current component due to saturation effects in transformers.

It can be very difficult to design normal regulators in power transmission systems so that they fulfil both the requirements which are made during normal operating conditions, whilst at the same time offering effective damping of critical resonant frequencies which exist in the network.

Similar resonance problems are present in alternating current networks for transmission when turbine generators are used. Because of the construction of such turbines, with their rotating masses affixed to necessarily torsion-elastic shafts, mechanical natural oscillations at subsyncronous frequencies (so-called negative damping) and similar oscillations can thus be fed to the network via the generators and also transmitted to other turbine generators in the network so that connected oscillations arise there-between. Similarly, interaction can occur with the network itself which often has large series condensers which, in cooperation with other reactances, can cause the network to oscillate. The subsyncronous oscillations (SSR) can, in certain cases, cause the turbine generators to break down whilst, in other cases, they are eventually damaged due to fatigue.

From U.S. Pat. No. 4,434,376 it is known to detect subsyncronous oscillations in alternating current systems, whereby the time separation between zero crossings of the voltage is detected and it is determined whether this differs from that which the system frequency should give. Such detected oscillations are thus damped by means of a regulating action which connects in one or more damping resistors. It is also known to dampen SSR by modulation of current/active power in a connected HVDC-station, whereby narrow band conventional filter circuits are used for diagnosis. In the cases where the thyristor circuits of the HVDC-system are sufficiently quick, the regulation itself can be performed without particular problems.

In order to avoid interruption, it is desirable to detect and dampen the transient oscillations at an early stage before the amplitude grows to critical values, or if the duration becomes too long. In order that this may be performed in a satisfactory manner, it is important to be able to differentiate between the operationally stipulated transient building-up processes and other processes which can result in resonant oscillations with subsequent disconnection or damage to other parts of the system.

In certain underwater cables for HVDC, and also in other cases, combinations of cable capacitance and smoothing inductances in the system can give rise to natural resonant frequencies which can create oscillations which are not self dampening and can grow such that safety devices which are present activate undesired interruption. In accordance with the invention, a temporarily compensating measure is introduced which quickly dampens the possible oscillation.

SUMMARY OF THE PRESENT INVENTION

The main object of the present invention is to provide a method and an arrangement for damping transient oscillations in power transmission systems which act quickly and correctly during oscillation build-up of critical frequency. The method and the arrangement should be able to distinguish undesired transient oscillations from transient oscillations during other regulating actions, such as ramps during starting up after faults or stabilizing actions, without interfering with these control regulations.

Another object of the invention is to protect cable and other expensive equipment in HVDC-systems against extreme overvoltage and subsequent damage.

It is a further object to dampen subsyncronous resonances in power transmission systems which comprise connected turbine generators.

These objects are achieved according to the invention by a method and an arrangement of the type which is given in the characterizing portion claim 1 and 12 respectively.

According to the invention, a regulating action is to be performed when it is established that an oscillation is present within the critical frequency range. An instigated action should be carried out for a certain time, with the object to achieve a total damping of the oscillation.

It is preferred that it be investigated whether the phase position for the detected oscillation does not vary too quickly with respect to the reference oscillator when there is an oscillation of a certain frequency. If it is determined that the phase position varies with an acceptably small speed, the regulating action should in such a case stay on the entire time. These desirable properties can be achieved in several various ways with various logistic conditions.

In accordance with preferred embodiments, a disturbance to the amplitude and phase at a natural resonant frequency is determined, whereby a low amplitude rules out any regulating action, whilst an amplitude which exceeds a limit value implies that a compensating regulating action can be proposed. However, normal regulating can imply that current or voltage in the cable temporarily displays a frequency content where the resonant frequency or a neighbouring frequency arises with an amplitude sufficient to propose regulating action. Typical for such occurrences are rapid crossings and alternating frequencies. It is thus suitably a requirement that a condition for actuation of regulating action is a presence for, for example 10–20 ms, preferably about 15 ms. Total regulating action should take place within 20 ms. In addition, the regulating action should quickly terminate when it is no longer required, especially when the cause is transient. Thus, one should have disconnection with an absence of exceeded values for up to 2–10 ms, for example, preferably 4 ms, in combination with an absence of exceeded values for 15–30 ms, preferably 20 ms, indicating that the transient oscillation is gone.

All of the time intervals relate to the case in which the system frequency is 50 Hz and the oscillation which is to be counteracted lies at or near the system frequency. If the frequency of interest instead is f Hz, the above mentioned times should thus be multiplied by 50/f.

The measurement of amplitude and phase for the natural resonant frequency can be carried out in different ways. At present it is preferred to measure these two variables in the form of sine and cosine components in relation to a fixed oscillator frequency. The criteria are triggered when the absolute values of these components to the sum exceed their limit values during the above-given time interval. In this manner, those cases in which the frequency varies can also be eliminated.

It is also possible to use other variable pairs, such as for example the amplitude of oscillation calculated by squaring and summating the sine and cosine components and the phase angle which is also derivable from the same components.

The proposed regulating action is suitably carried out for disturbances in HVDC plants by means of regulating the included valves. For disturbances in alternating current transmission networks with turbine generators, regulating action can be performed so that the oscillation is damped if an HVDC plant is connected to the network. The voltage regulator of the turbine can also be influenced. A third possibility when subsyncronous frequencies are detected is to allow the regulating signal to control a regulating arrangement which connects damping circuits which are known per se in the system.

The method and arrangement are intended to rectify oscillations at or near a certain frequency. In those cases in which more frequencies are susceptible to oscillation, it is suitable to use several separate arrangements according to the invention, which each working with an oscillator frequency. This is normally the case for subsynchronous resonance, the source of which comes from mechanical oscillations in steam and gas turbines, though which can also arise in high voltage direct current transmission where the number of oscillation frequencies is normally low.

In certain cases it can be suitable to permit the amplification in the regulating loop to increase when the size of the oscillation exceeds a value which is higher, for example three times higher, than the value which can lead to the connection of the regulating signal.

Although the invention is exemplified below with specific circuits such as gates and shift registers, it is obvious for the skilled person that it is possible to implement the same with a computer.

DESCRIPTION OF THE DRAWINGS

In order to simplify understanding of the present invention, it will be described in the following by way of example only and with reference to the attached drawings in which.

DESCRIPTION OF EMBODIMENTS

Figure 1:
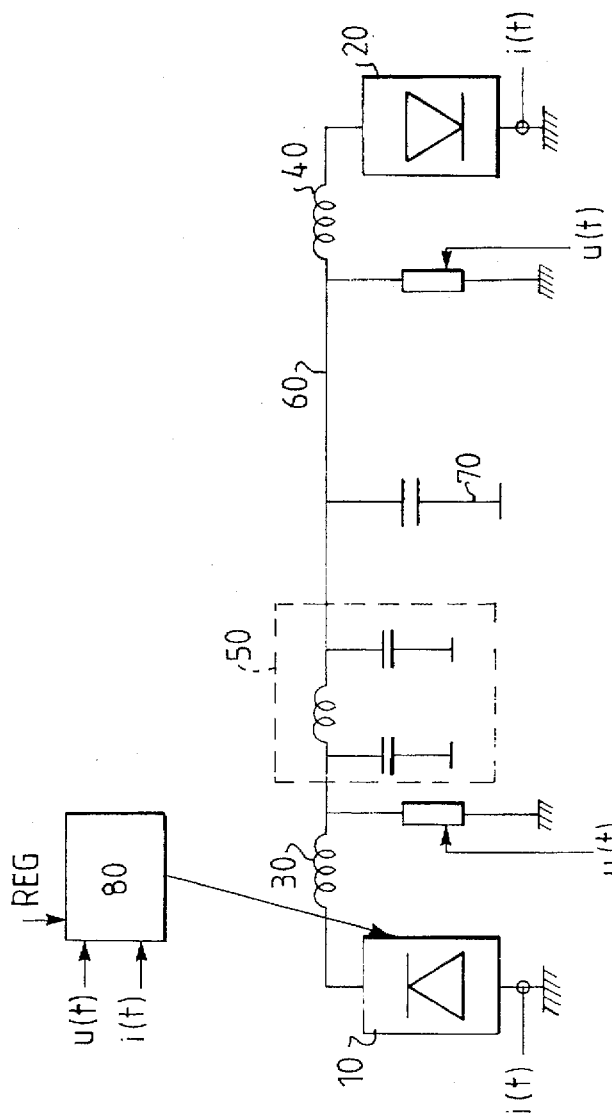
FIG. 1 shows a schematic representation of the principal configuration in an HVDC-plant.

The present invention is intended to monitor and react to the appearance of oscillations with a certain frequency in a plant according to FIG. 1 with regard to the configuration of capacitances and inductances in the system. In FIG. 1, reference numeral 10 denotes a rectifier, 20 an inverter, 30 and 40 smoothing reactances, 50 a line, 60 a cable, 70 a distributed capacity in the cable, 80 a regulating system, Reg a regulating system from an arrangement according to the invention and i(t) and u(t) time-dependent current and voltages respectively. It is presently preferred to use i(t) as the measured variable.

Figure 2:
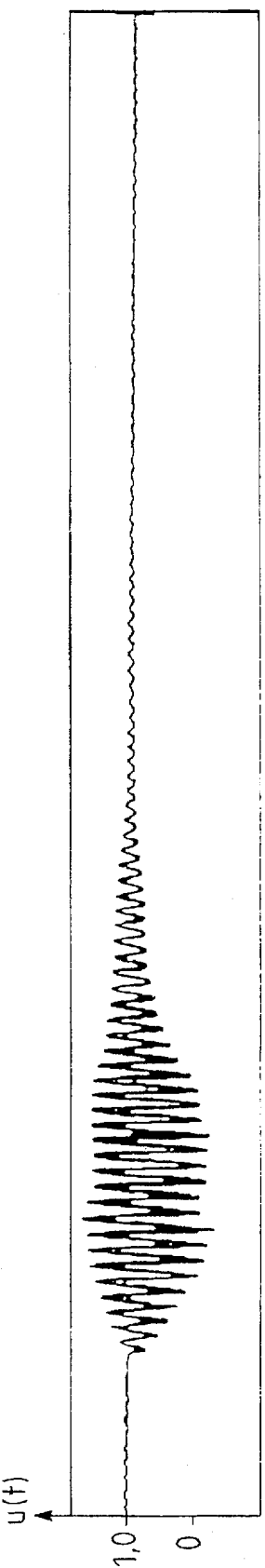
FIG. 2 shows an operating signal in which a 50 Hz resonant oscillation arises because of a misfiring rectifier.

At certain frequencies, the natural resonance in the system is particularly large and can arise at the system frequency or other frequency. In the same system there may be several such natural resonant frequencies, whereby a device according to the invention is suitably arranged for each such frequency. In FIG. 2, a resonant oscillation at 50 Hz in a 500 kV cable in an operating signal is shown which is caused by a misfiring rectifier, safety equipment which is present has been triggered and the oscillation has slowly been damped out.

Figure 3:
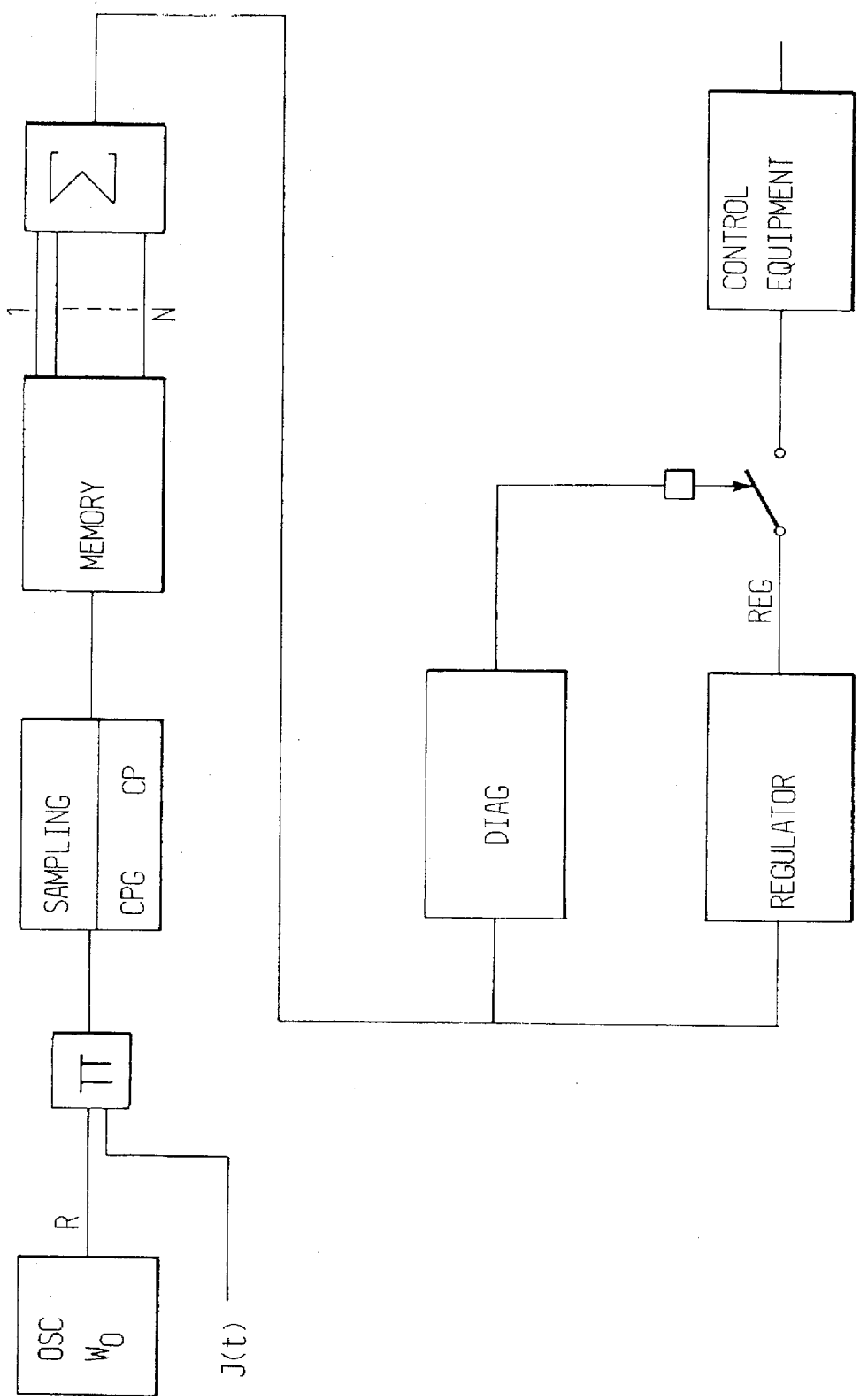
FIG. 3 shows a flow diagram for the method according to the present invention, which flow diagram at the same time can serve as a block diagram for an arrangement according to the present invention.

With a method according to the flow diagram in FIG. 3 and an arrangement according to a block diagram which is totally analogous with the flow diagram, oscillations of the above-mentioned type can be detected within a time period and, by implementing a regulating action based on calculation of the regulating signal according to the present invention, an oscillation can quickly be damped before safety equipment is able to be activated.

Figure 4:
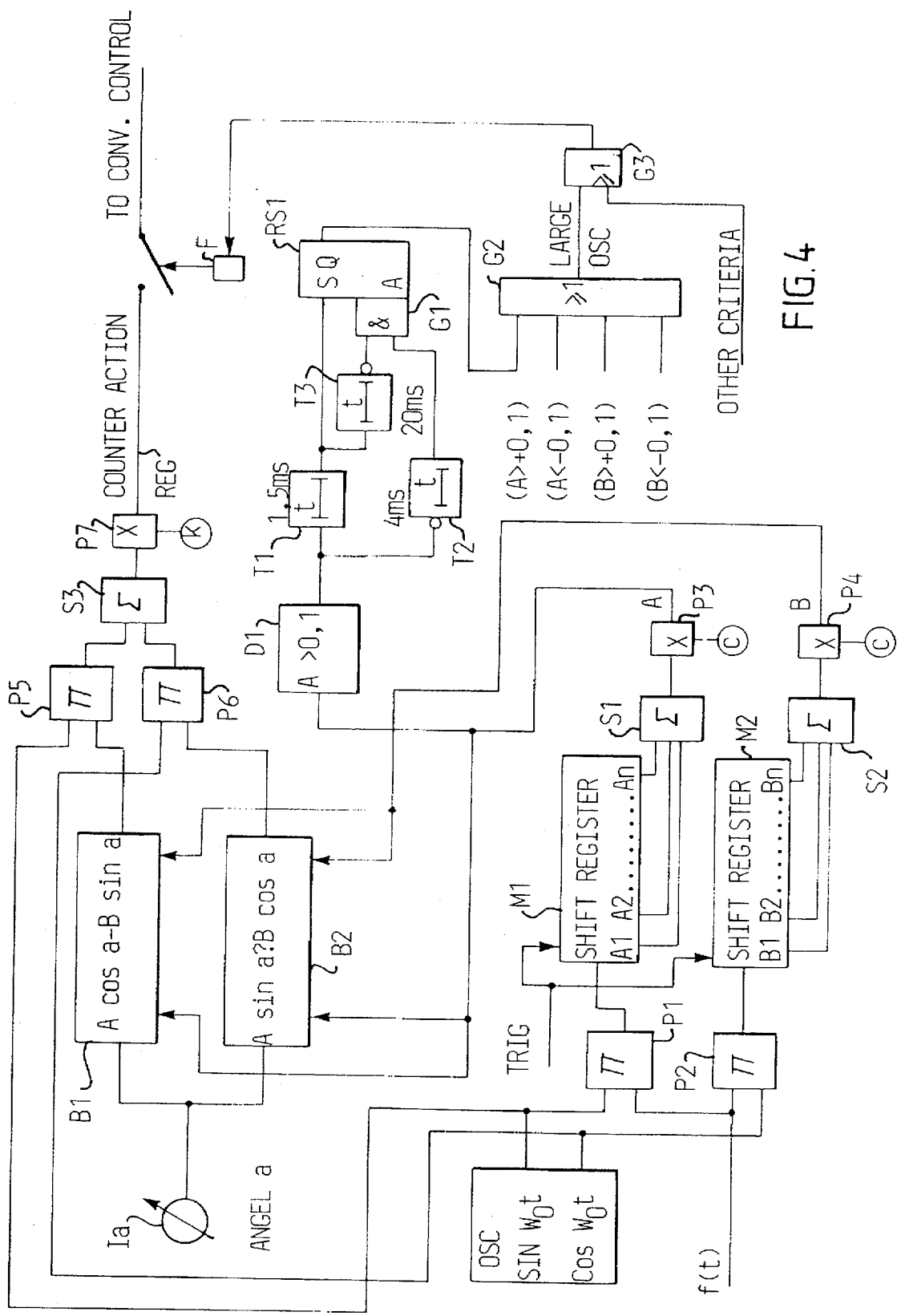
FIG. 4 shows a circuit diagram for an embodiment according to the invention.
Figure 5:
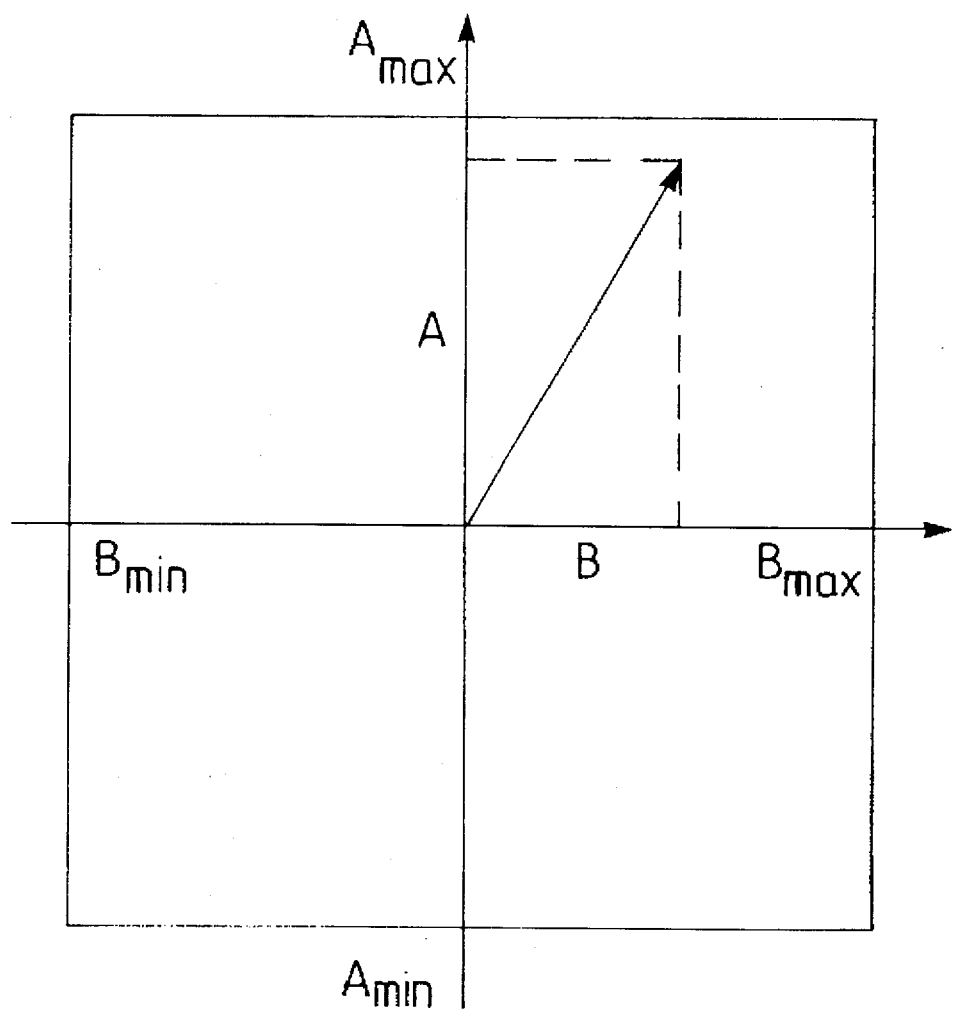
FIG. 5 shows a vector diagram for current or voltage in the HVDC-plant.

With reference to FIGS. 4 and 5, the invention will now be described with the help of a schematically shown embodiment. An oscillation Osc adjusted to the resonant frequency in question emits the reference signals $\sin \omega_0 t$ and $\cos \omega_0 t$ respectively, each of which is multiplied in its own multiplication circuit P1, P2 respectively by an analogue operational signal f(t) (for example u(t) or i(t) in FIG. 1) corresponding to the present operating condition of the HVDC-plant. The products $f(t)*\sin \omega_0 t$ and $f(t)*\cos \omega_0 t$ respectively are sampled at discreet time intervals which are determined by the clock-pulse signal Trig in a shift register M1, M2 respectively for each product, and each shift register having a series input and a parallel output. The latest sampling values to a number which at least corresponds to the period of the reference signal are stored in the shift registers M1 and M2. The n latest sampling values A1 . . . An, B1 . . . Bn respectively which correspond to one or more complete cycles of the reference signal are summated for each clock-pulse in summation circuits S1, S2 respectively and thereafter multiplied in multiplication circuits P3, P4 respectively with a normalizing constant c so that two values A and B are obtained. The values A and B represent a condition of the operating signal f(t) according to the vector diagram in FIG. 5 which corresponds to phase and amplitude of a superimposed oscillation in the direct current system.

A and B are tested in a diagnostic and determination circuit which, in the circuit diagram, is only shown for a maximum permitted value of A but is totally analogous to the minimum value of A and the minimum and maximum values of B respectively. In the embodiment, the selected numerical limit values are $-0,1<A<0,1$, $-0,1<B<0,1$ respectively corresponding to 0,1 times the rated current or rated voltage. For values of A which, according to the threshold circuit D1, exceed 0,1, the presence of the transgression (the signal level) in time circuits T1, T2, T3 respectively is tested so that if $A>0,1$ for more than 15 ms according to T1, it is considered that an oscillation is present and an RS-flip-flop RS1 is set. If A is then greater than 0,1 for 4 ms according to T2 and, at the same time, absent for 20 ms according to T3, the flip-flop is reset via the AND-gate G1. As long as the RS-flip-flop for $A>0,1$ or corresponding flip-flop for any one of the other conditions ($A<-0,1$, $B>0,1$, $B<-0,1$) are set, or any other criteria (Other Criteria) are attained, a circuit closer F is operated to apply regulating action via the OR-gates G2 and G3.

Sustained oscillations of lower amplitude can also be monitored by, for example, selecting a level 0,02 times the rated value and a time delay of 40 ms. Oscillation within the interval 0,75–1,15 times the adjusted frequency can then be detected. This information can thereafter, possibly after an additional operational delay in order to eliminate interference, be included as "Other Criteria" according to FIG. 4.

Figure 7:
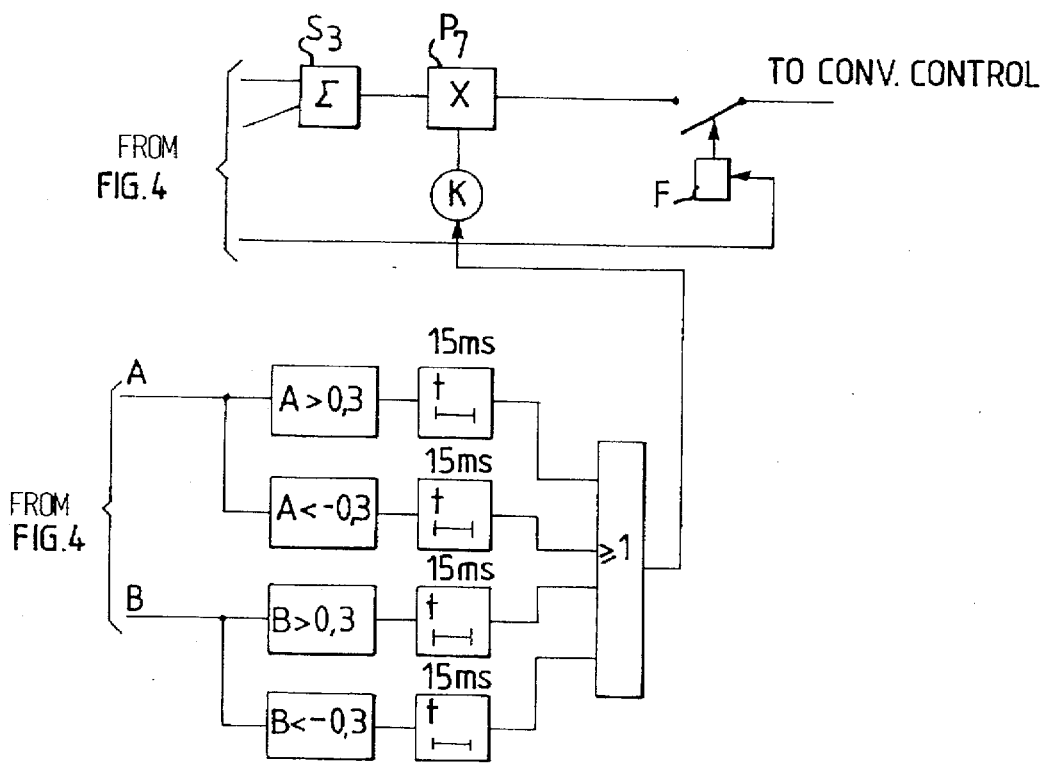
FIG. 7 shows an additional arrangement for the circuit shown in FIG. 4.

It has also been shown to be suitable for serious faults with valves which misfire to increase the amplification in the regulating circuit by a factor of approximately 3 in relation to the normal case. This can occur for example as shown in FIG. 7 which is to be compared with FIG. 4. In such an example, a larger limiting value is used, such as 0,3, the exceeding of which during some certain time such as 10–40 ms, preferably 15 ms (for frequency 50 Hz otherwise correspondingly corrected) implies that the amplification is increased by changing the constant k so that the output signal from the multiplication circuit P7 is correspondingly amplified.

With reference to FIG. 4, at each sampling interval, A and B are transmitted to an arrangement for generating a regulating signal. In two calculating circuits B1, B2 respectively (A*cos a–B*sin a) and (A*sin a+B*cos a) are calculated where the angle a is adjustable by means of an adjustment knob Ia. In addition, in multiplying circuits P5, P6 respectively (A*cos a–B*sin a) is multiplied by $\sin \omega_0 t$ and (A*sin a+B*cos a) is multiplied by $\cos \omega_0 t$ from the oscillator and thereafter summarized in a summarizing circuit S3 so as to be finally multiplied in a multiplying circuit P7 with yet another normalization constant k so that the regulating signal $Reg=k*(A*\sin(\omega_0 t+a)+B*\cos(\omega_0 t+a))$ is obtained. The delay angle a is chosen for the best damping with regard to delay due to the sampling and in the present embodiment can be selected to be 145°. The regulating signal Reg is, as mentioned earlier, connected to the diagnostic and determination circuit via a switch G for operating the regulating action. The regulating signal Reg thus has the same frequency as the resonance frequency, an amplitude determined by the disturbance's amplitude and a phase determined by the disturbance's phase, modified by the time delay of the circuit and the angle a.

The criteria for amplitude and phase angle can be explained with help of a vector diagram according to FIG. 5. A and B denote the sin and cos component respectively of the vector, and the surrounding rectangle indicates limits for unconditionally allowable values of A and B respectively. If the amplitude of the operating signal exceeds permitted values, the vector leaves the shown rectangles and regulating action may possibly be instigated. An observed exceeding of the said limiting values does not however have to imply that a dangerous resonant oscillation has arisen, but instead it may be that a normal course of events can have been recognized as coincidental amplitudes at a resonant frequency. Oscillation at a frequency which is somewhat different from the resonant frequency will appear in the indicator diagram as a vector which rotates with a speed determined by the difference in frequency between the oscillator frequency (i.e. the selected resonant frequency) and the oscillation in question. Due to the said conditions, such an oscillation will not initiate any regulating action. Should, however, the vector remain stationary or rotate slowly, an oscillation with the same or similar frequency as the reference signal is present and resonance must be seen to be present and consequently a regulating action will be initiated.

The preferably temporary regulating action (which according to the above in certain cases can be permanent) according to the invention can be initiated in the normal regulating of the HVDC-system which regulates the firing moments for included controlled rectifiers. The normal control equipment adjusts the firing moments to a certain firing angle α, calculated in each rectifier part from the lead current's positive zero crossings. It is suitable to let the regulating signal according to the invention, with by-pass connection of the normal regulating, directly influence the firing angle α, whereby necessarily rapid damping is advantageously obtained.

Figure 6:
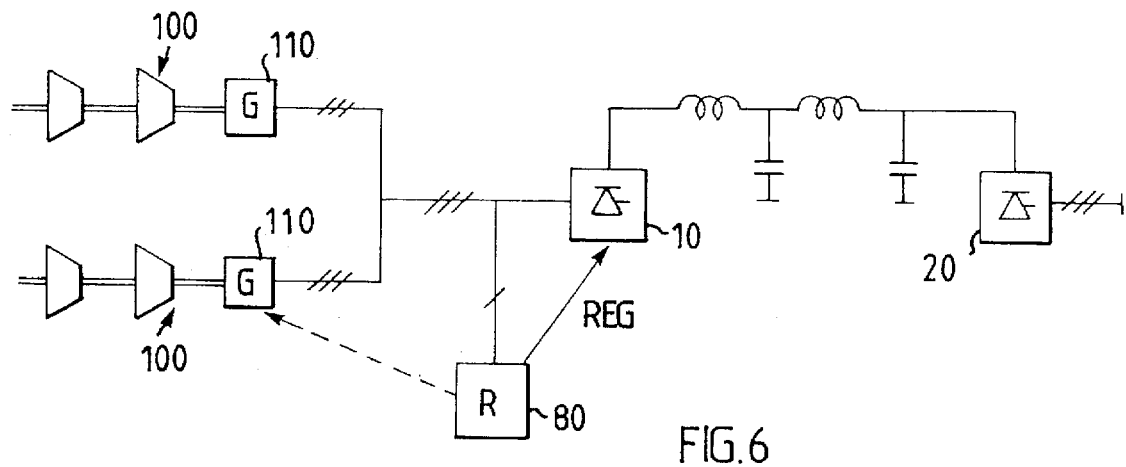
FIG. 6 shows how the invention can be used in an electrical network in which one or more steam or gas turbines are present.

The described principle for detection and damping of transient oscillations can also be used for those oscillations which arise in alternating current networks and have low frequencies in relation to the system frequency. An example of this is shown schematically in FIG. 6 and in which some of the same reference numerals as in FIG. 1 are used. Two turbine plants 100 with generators 110 are connected to a three-phase network which is also connected to an HVDC-network. In such a case, the regulator circuit R in the alternating current network is examined in order to determine in a corresponding manner as given above possible resonant oscillations at subsyncronous frequencies. Current voltage in a phase conductor is suitably used as a variable and the regulating action REG is transmitted to the rectifier arrangement 10. Alternatively, and as shown in dashed lines, the regulating signal can be transmitted to a control circuit of the generator G. Since in this case a number of possible oscillating frequencies (inherent values) can arise, each of these should be monitored.

A particular advantage with the invention is that its action need only be as temporary as the disturbances which it is intended to eliminate, thereby implying that the regular control is disturbed as little as possible. A further particular advantage is that with detection and damping of oscillation carried out according to the invention, oscillations which do not totally lie at the selected frequency of the reference signal can also be effectively detected and dampened.

I claim:

1. Method for damping oscillations at or near a natural resonant frequency in a power transmission system, comprising the steps of obtaining a reference signal (R) from an oscillator (Osc) oscillating at the natural resonant frequency;

multiplying the reference signal by an analogue operating signal (f(t)) corresponding to the prevailing operating condition at some point in the power transmission system;

sampling the analogue signal resulting from the multiplication with a sampling frequency ($\omega_s$) which is at least twice as high as the frequency of the reference signal;

storing the digital sampling values successively in a memory to a number which at least corresponds to the period of the reference signal;

thereafter calculating at each sampling instance a sum of a number (n) of the latest sampling values which correspond to one or more entire periods of the reference signal, whereby the sum represents the phase angle and amplitude of an oscillation in the operating signal;

testing the sum in at least one diagnostic and determination circuit (Diag) for detection of oscillations according to predetermined criteria and determination of activation of regulating action;

calculating a regulating signal (Reg) for each sampling instance dependent on the characteristic sum for the oscillation and dependent on the reference signal R, and transmitting the regulating signal (Reg) to a regulating arrangement in the power transmission system when the oscillation meets any one of the predetermined criteria so that the oscillation is dampened to predetermined tolerances.

2. Method according to claim 1, wherein said reference signal consists of two components corresponding to $R1=\sin(\omega_0 t)$ and $R2=\cos(\omega_0 t)$, and in that the reference signals R1 and R2 are each multiplied by the operating signal f(t) and result in signals a(t) and b(t) respectively.

3. Method according claim 1 wherein the signals a(t) and b(t) are sampled with said sampling frequency ($\omega_s$) and in that the sampling values (a, b respectively) are stored in a memory.

4. Method according to claim 1 wherein two set of sampling values (A1 ... An, B1 ... Bn respectively) of the said number (n) are each summated to its resulting value (A, B respectively), which together represent a condition in said operating signal (f(t)) at each sampling instance.

5. Method according to claim 1 wherein the summations (A and B) are tested in at least one diagnostic and determination circuit (Diag) for detection of oscillations with various characteristics, for example oscillations at one or more critical frequencies, oscillations with relatively high frequency and amplitude and/or lasting oscillations with relatively low frequency and amplitude, or other predetermined criteria.

6. Method according to claim 5, wherein if said summations (A, B respectively) permanently exceed or fall below predetermined values corresponding to the size of the amplitude of one oscillation, said regulating signal (Reg) is sent to said regulating arrangement.

7. Method according to claim 6, wherein said regulating signal (Reg) is generated with the help of the said summations (A, B respectively) and is dependent on the oscillator signal and sin a, cos a respectively, where a is a suitable value for the regulating action, whereby signals corresponding to A*cos a−B*sin a and A*sin a+B*cos a respectively are generated, said above-mentioned signals corresponding to A*cos a−B*sin a and A*sin a+B*cos a respectively are each multiplied by the components $R1=\sin(\omega_0 t)$ and $R2=\cos(\omega_0 t)$ respectively of the first-mentioned oscillation (Osc), the products $\sin(\omega_0 t)$*(A*cos a−B*sin a) and $\cos(\omega_0 t)$*(A*sin a+B*cos a) respectively are summated so that the regulating signal (Reg) corresponds to A*sin($\omega_0$+a)+B*cos($\omega_0$+a).

8. Method according to claim 7, wherein said above-mentioned angle a is adjustable.

9. Method according to claim 1, wherein the regulating signal is sent to a regulating arrangement in a static converter in an HVDC-system.

10. Method according to claims 1, wherein the regulating signal is sent to a generator control circuit for a turbine generator.

11. Method according to claim 1, wherein the degree of amplification of the regulation is adjustable and in that it is adjusted depending on the size of the detected oscillation.

12. Apparatus for damping oscillations at or near a natural resonant frequency in a power transmission system, comprising:

an oscillator for emitting a reference signal oscillating at the natural resonant frequency;

a multiplication circuit for multiplying an operating signal corresponding to the prevailing operating condition of the HVDC-system with the reference signal;

a memory and a clock-pulse generator for serially sampling the output signal from the multiplication circuit by means of clock-pulses, the memory has the capacity to store sampling values up to a number which at least corresponds to the period of the reference signal;

a summation circuit which, via a parallel output from the memory, for summing a number of the latest sampling values which corresponds to at least one whole period of the reference signal;

a diagnostic and determination circuit provided with the output signal from the summation circuit, in which circuit the size, sign, variability and presence of an output signal from the summation circuit is tested according to determined criteria;

means for generating a regulating signal provided with an output signal from the summation circuit, and a circuit closure activated by the output signal from the diagnostic and determination circuit when a criterion for oscillation which is to be damped is fullfilled, which circuit closer is placed between the output of the means for generating a regulating signal and a regulating device in the power transmission system.

13. Apparatus according to claim 12, wherein said memory is a shift register.

14. Apparatus according to claim 12, further comprising means for regulating the amplification of the regulating signal depending on the size of the tested signal.

* * * * *